United States Patent [19]

Nasser, Jr. et al.

[11] 4,188,471
[45] Feb. 12, 1980

[54] ORGANOCHROMIUM ON TITANIUM-IMPREGNATED BASE AS OLEFIN POLYMERIZATION CATALYST

[75] Inventors: Benny E. Nasser, Jr.; Joseph A. Delap, both of Bartlesville, Okla.

[73] Assignee: Phillips Petroleum Company, Bartlesville, Okla.

[21] Appl. No.: 529,551

[22] Filed: Dec. 4, 1974

[51] Int. Cl.$^2$ .......................... C08F 4/02; C08F 10/02
[52] U.S. Cl. .................... 526/96; 252/431 R; 526/352
[58] Field of Search .................. 252/430, 431 R; 260/93.7, 94.9 D, 94.9 DA; 526/96, 113

[56] References Cited

U.S. PATENT DOCUMENTS

| | | | |
|---|---|---|---|
| 2,825,721 | 3/1958 | Hogan et al. | 260/94.9 D |
| 2,912,421 | 11/1959 | Juveland et al. | 260/94.9 D |
| 3,014,020 | 12/1961 | Balthis | 260/94.9 D |
| 3,326,871 | 6/1967 | Shepard et al. | 260/94.9 D |
| 3,349,067 | 10/1967 | Hill | 260/94.9 D |
| 3,485,771 | 12/1969 | Horvath | 260/94.9 D |
| 3,646,000 | 2/1972 | Horvath | 260/94.9 D |
| 3,709,853 | 1/1973 | Karapinka | 260/94.9 DA |
| 3,780,011 | 12/1973 | Pullukat et al. | 260/94.9 D |
| 3,806,500 | 4/1974 | Karol | 260/94.9 DA |
| 3,862,104 | 1/1975 | Witt | 260/94.9 D |
| 3,879,362 | 4/1975 | Chalfont et al. | 260/94.9 D |
| 3,884,832 | 5/1975 | Pullukat et al. | 260/94.9 E |

*Primary Examiner*—Edward J. Smith

[57] ABSTRACT

A particulate catalyst support such as silica or a silica-titania cogel is impregnated with a titanium compound from a nonaqueous solution and the resulting composition heated to activation temperature and thereafter impregnated with a $\pi$ bonded organochromium compound. Finally the chromium-containing support is heated to reactivate same. Such catalysts are particularly suitable for polymerizing at least one mono-1-olefin containing 2 to 8 carbon atoms per molecule.

8 Claims, No Drawings

ORGANOCHROMIUM ON TITANIUM-IMPREGNATED BASE AS OLEFIN POLYMERIZATION CATALYST

BACKGROUND OF THE INVENTION

This invention relates to low temperature reactivated organochromium olefin polymerization catalysts.

Supported chromium-containing catalysts can be used to prepare olefin polymers in a hydrocarbon solution to give a product having excellent characteristics from many standpoints. Supported chromium-containing catalysts can also be used to prepare olefin polymers in a slurry system wherein the polymer is produced in the form of small particles of solid material suspended in the diluent. This process, frequently referred to as a particle-form process, has the advantage of being less complex. However, one method of controlling the molecular weight of the resulting polymer in the solution process is simply to vary the temperature, with lower molecular weight (higher melt flow) polymer being produced at the higher temperature. It is readily apparent that this type of process control is severely limited in a particle-form process since any substantial increase in temperature would cause the polymer to go into solution.

BRIEF SUMMARY OF THE INVENTION

It is an object of this invention to provide a catalyst for producing high melt flow polymer in a particle-form process;

It is a further object of this invention to provide a simplified process for producing olefin polymers; and It is yet a further object of this invention to provide an improved chromium-containing catalyst.

In accordance with this invention, a particulate base is impregnated with a nonaqueous solution of a titanium compound, activated at an elevated temperature, thereafter impregnated with a π bonded organochromium compound, and finally heated to reactivate same.

DESCRIPTION OF THE PREFERRED EMBODIMENTS

Preferred supports are silicon-containing materials such as silica, silica-alumina, silica-titania, and the like. The supports are particulate in nature and they can be prepared by precipitation and coprecipitation techniques, or by mixing silica with other refractory materials. For example, sodium silicate can be added to an acid such as sulfuric acid, the resulting precipitate aged for at least one hour, water-soluble salts removed by washing with water, and then the water removed by azeotropic distillation with a material such as ethyl acetate. Silica generally constitutes the major portion of the support with other metal compounds when used making up from 0.1 to about 20 weight percent of the finished catalyst. Cogels are particularly preferred supports. These are produced by coprecipitating an alkali metal silicate solution such as water glass and a titanium compound such as titanium potassium oxalate or titanyl sulfate by adding said silicate to a mineral acid such as sulfuric acid, said acid containing said titanium compound, to form a hydrogel. The hydrogel is preferably aged for a time of greater than one hour, washed with water to produce a substantially alkali metal-free hydrogel and then treated with a water soluble liquid organic compound which forms an azeotrope and to effect azeotropic distillation to remove water and form a xerogel.

Other drying methods such as spray drying from a water suspension, or simply heating a hydrogel cake in an oven may be used. If the base contains moisture, it can be dried by heating at about 212° F. to 500° F. for about 1-10 hours prior to the subsequent treatment with titanium.

This base is then impregnated with a nonaqueous solution of a titanium compound. Any hydrocarbon soluble titanium compound can be used. Preferred compounds are titanium acetylacetonate, tetraisopropyl titanate or titanium tetrachloride, or mixtures thereof. The amount of titanium deposited on the support from this impregnation step is within the range of 0.1 to 10, preferably 0.5 to 3 weight percent based on the weight of the titanium-containing supports and 0.5 to 10, preferably 1 to 8 weight percent based on the weight of the titanium-free supports. The mixture is dried and calcined (activated) in air at a temperature within the range of 700°-2000° F., preferably 900°-1700° F., for ½ to 50 hours, more preferably 2-20 hours, to prepare it properly for the subsequent impregnation with the π bonded organochromium compound.

The π bonded organochromium compounds employed in the catalysts of this invention are known in the art. Preferred are the diarene chromium compounds having the following structure:

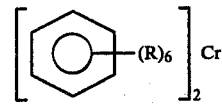

wherein R is selected from the group consisting of hydrogen and alkyl radicals having from 1 to 6 carbon atoms. Examples of these compounds include dibenzene chromium, ditoluene chromium, di-o-xylene chromium, di-p-xylene chromium, dicumene chromium, dimesitylene chromium, di(n-propylbenzene) chromium, di(1,3,5-triethylbenzene) chromium, di(1,3-diethyl-4-hexylbenzene) chromium, di(1,3-dipentylbenzene) chromium, di(1,3,5-trihexylbenzene) chromium, di(hexamethylbenzene) chromium and the like. It is believed that the chromium in these diarene compounds has a valence of 0, the two organo groups thus being the same or different ligands.

The organochromium compounds are liquids or solids soluble in many organic solvents. Preferred solvents are non-polar liquids at ambient temperatures which are sufficiently volatile to allow removal by evaporation. Examples of suitable solvents include alkanes, cycloalkanes, aromatic hydrocarbons, halogenated compounds, ethers and the like. Exemplary compounds include pentane, n-hexane, decane, cyclohexane, methylcyclohexane, benzene, xylenes, chloroform, diethyl ether, etc., and mixtures of one or more of the pure compounds. A sufficient quantity of a solution of the chromium compound is used to completely wet the support and fill the porous structure to insure even distribution of the metal compound on the support. Generally, the solutions contain from about 0.002 to about 25 weight percent of the organochromium compound.

A sufficient volume of the solution of the organochromium compound is taken so as to provide from about 0.01 to 30, preferably from 0.1 to 10 parts by weight of the organochromium compound per 100 parts by weight of the activated support. The contact between the support and metal solution is effected in a conventional way such as by slurrying and at any convenient temperature. Generally, ambient temperature is used, although temperatures ranging from about the freezing point of the solvent to as high as about 300° F. can be employed during the contacting period. Contact times from a few seconds to several hours are adequate.

After the contacting operation it is necessary to reactivate the composite. This can be done by heating for about 0.5 to 20 hours, more preferably about 1 to 5 hours. Suitable reactivation temperatures include those from about 250° to 650° F. or higher. Temperatures of 250°–650° F., more preferably about 300° to 400° F. have been found particularly suitable to prepare the catalyst for polymerization. This heating can be done under vacuum, or in an inert atmosphere such as nitrogen. A flowing stream of nitrogen is preferred in some instances. As an example, when dicumene chromium is used a lower temperature (about 350° F.) is optimum under nitrogen. With dibenzene chromium, a temperature of about 350° F. is optimum when using nitrogen.

The 1-olefin polymers prepared with the catalysts are normally solid and consist of polymers of at least one mono-1-olefin having 2–8 carbon atoms per molecule. Most preferred are polyethylene and copolymers of ethylene with another mono-1-olefin containing from 3 to 8 carbon atoms per molecule. Examples of the 1-olefin comonomer include propylene, 1-butene, 1-hexene, 1-octene and the like.

The catalysts of the invention are particularly useful for the preparation of high melt flow ethylene polymers. The polymers which are produced with the catalyst made in accordance with this invention are normally solid homopolymers of ethylene or copolymers of ethylene with another mono-1-olefin containing 3 to 8 carbon atoms per molecule. As an example, the olefin polymer can be produced from at least one aliphatic mono-1-olefin having 2 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80–99, preferably 95–99 mole percent of ethylene. These polymers are well suited for extrusion, blow molding, injection molding and the like.

The polymerization process using the catalyst of this invention is conducted in the gaseous phase or in liquid phase, generally in the presence of an inert hydrocarbon diluent. Suitable diluents are those hydrocarbons having from 3 to 12 carbon atoms per molecule, generally selected from paraffins, cycloparaffins and aromatics with the paraffinic hydrocarbons being more preferred. Preferred diluents include propane, n-butane, isobutane, n-pentane, isopentane, n-hexane, n-heptane, 2,2,4-trimethylpentane, cyclopentane, cyclohexane, methylcyclohexane, n-dodecane and mixtures thereof. It is preferred to have one of the previously mentioned diluents present in the liquid phase to facilitate removal of the heat of reaction. The pressure is generally in the range of 0 to 2000 psig and need be no more than sufficient to maintain the diluent in liquid phase, i.e. 50 to 750 psig.

The polymerization reaction in accordance with this invention is generally carried out within the temperature range of 100° to 500° F. Most frequently, the range is from 150° to 350° F. since polymer yields are highest within this range. In a presently preferred embodiment, the temperature range is from 150° to 230° F. so that the polymer particles form a suspension in the reaction mixture, i.e. particle form process. At higher temperatures the polymer in most cases forms in solution in the diluent in the reaction zone, i.e. a solution process.

The contacting of monomer or monomers with the catalyst can be effected by any of the techniques known in the art of solid catalysis. A convenient method is to suspend the catalyst in the liquid diluent and to agitate the reaction mixture, thus maintaining the catalyst as a solid suspension in the liquid diluent. Other known catalytic contacting methods such as fixed bed, fluidized bed, gravitating bed, etc., can also be used. Reference to production of ethylene polymers according to particle form processes is found in U.S. Pat. No. 3,624,063, the disclosure of which is hereby incorporated by reference.

The particle-form process in which the catalyst of this present invention is particularly applicable is a process in which at least one olefin is polymerized at a temperature within the range of about 150°–230° F. by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperature are such that the polymer produced is insoluble in the medium and is recovered in the form of solid particles. The organic medium (diluent) is generally a paraffin and/or cycloparaffin having from 3 to 12 carbon atoms per molecule. Representative examples include propane, butane, isobutane, pentane, isopentane, cyclohexane, n-dodecane, methycyclohexane and the like. Pressures can range from about 100 to 700 psig or higher, and catalyst concentrations can range from 0.001 to about 1 weight percent based on the weight of the reactor contents.

Hydrogen can be used to decrease the molecular weight of the polymers produced with the catalyst of this invention if desired (i.e., give a much higher MI), the catalyst of this invention being particularly sensitive to the beneficial effects of introducing hydrogen to control molecular weight. Partial pressure of hydrogen when hydrogen is used can be within the range of 5 to 100 psig, preferably 10 to 50 psig. The melt indices of the polymers produced in accordance with the instant invention can range from about 0.1 to about 70 or even higher.

EXAMPLE I

A series of catalysts was prepared from silica or silica-titania cogel supports.

In the runs within the scope of the invention, the support was dried by heating in air at 300° F. for 2 hours and then impregnated with a n-pentane solution of tetraisopropyl titanate sufficient to add 3 weight percent titanium based on the dry composite for silica alone, or 1 weight percent titanium on silica-titania; the solvent was evaporated off and the composite was activated by calcining it in dry air at 1600° F. for 5 hours. In the controls the titanium-free supports were calcined in dry air at 1600° F. for 5 hours. Thereafter the thus titanium-impregnated and calcined supports of the invention and the calcined supports of the controls were impregnated with a n-pentane solution of dicumene chromium to give 1 weight percent chromium. Finally the thus chromium-impregnated supports were reactivated at 300° F. for 1 hour under nitrogen. The catalysts were as follows:

Catalyst A was prepared from a commercially available microspheroidal silica containing about 0.1 weight percent alumina. This control catalyst contained no titanium.

Catalyst B was prepared from the same silica as Catalyst A. This invention catalyst contained 3 weight percent titanium added by impregnation.

Catalyst C was prepared from a synthetic silica containing no alumina. This control catalyst contained no titanium.

Catalyst D was prepared from the same silica as Catalyst C. This invention catalyst contained 3 weight percent titanium added by impregnation.

Catalyst E was prepared from a coprecipitated silica-titania cogel containing 7.5 weight percent titania. This control catalyst contained no added titanium, i.e., no titanium incorporated by impregnating the support.

Catalyst F was prepared from the same silica-titania cogel of Catalyst E. This invention catalyst contained 1 weight percent added titanium.

The catalysts were used to polymerize ethylene in a 3 liter stirred reactor containing 1¼ pounds of isobutane as diluent. The amount of catalyst added to the reactor varied over the range of about 0.08 to about 0.10 grams which is equivalent to about 0.014–0.017 weight percent based on the reactor contents prior to initiating polymerization. The results are presented in Table 1.

and 8 shows. Runs 6, 7, 8, 9 and 10 show the effect of the presence of hydrogen and the reactor temperatures on increasing the melt index of polymers prepared over the catalysts. The results with the invention catalysts show impregnation of the base with a titanium compound is essential in the formation of an active polymerization catalyst with dicumene chromium supported on silica and is essential to give high melt index with dicumene chromium supported on a titanium-silica cogel.

EXAMPLE II

A portion of the microspheroidal silica used to prepare Catalyst A of Example I was dried at 300° F. in dry air for 2 hours. The product was then impregnated with a n-hexane solution of tetraisopropyl titanate sufficient to add 3 weight percent titanium based on the dry composite, the solvent was evaporated off and the composite was conditioned by calcining it in dry air at 1500° F. for 5 hours. Catalyst G was prepared by impregnating this conditioned composite with a n-hexane solution of dicumene chromium sufficient to add 1 weight percent chromium based on the dry mixture. After evaporation of the solvent in a nitrogen atmosphere, the catalyst was activated by heating it for 2 hours at 300° F. in nitrogen. Catalyst H was prepared by impregnating a commercially available intermediate density silica with a n-hexane solution of tetraisopropyl titanate sufficient to add 2.5 weight percent titanium based on the dry composite. After evaporation of the solvent the composite was Table 1

| Run No. | Catalyst | Added Titanium wt. % | Particle Form Polymerization of Ethylene | | | | Reactor Temp. °F. | Reactor Pressure, psig | |
|---|---|---|---|---|---|---|---|---|---|
| | | | Polymer | | | Prod.[c] | | | |
| | | | M.I.[a] | HLMI[b] MI | Density g/cc | | | Total | H$_2$ |
| 1 | A | 0 | | no reaction | | | | | |
| 2 | B(inv.) | 3 | 43 | 47.5 | 0.9646 | 2420 | 210 | 430 | 30 |
| 3 | C | 0 | | no reaction | | | | | |
| 4 | D(inv.) | 3 | 69 | 42 | 0.9660 | 3060 | 210 | 430 | 30 |
| 5 | F | 0 | 7.7 | 55 | 0.9650 | 2890 | 210 | 430 | 30 |
| 6 | F(inv.) | 1 | 4.9 | 73 | 0.9658 | 2990 | 210 | 430 | 0 |
| 7 | F(inv.) | 1 | 13.4 | 59.5 | 0.9632 | 2920 | 210 | 430 | 10 |
| 8 | F(inv.) | 1 | 18.1 | 51.5 | 0.9640 | 2980 | 210 | 470 | 30 |
| 9 | F(inv.) | 1 | 24.6 | 47 | 0.9654 | 3300 | 215 | 470 | 30 |
| 10 | F(inv.) | 1 | 41 | 47 | 0.9644 | 3210 | 215 | 475 | 50 |

[a]Melt index according to ASTM D 1238-62, condition E.
[b]High load melt index according to ASTM D 1238-62, condition F; the HLMI/MI ratio is a measure of polymer molecular weight distribution, the higher the value the broader the distribution.
[c]Productivity in terms of pounds polymer produced per pound catalyst.

Inspection of the results reveals that dicumene chromium on a silica support prepared as described above is inactive as an ethylene polymerization catalyst in the absence of titanium as control runs 1 and 3 show. When such supports are post-titanated in the manner of the invention before treating with the organochromium compound, the final composites obtained are active ethylene polymerization catalysts and polymer produced over them in the presence of hydrogen has melt indexes of 43 to 69 as runs 2 and 4 show. Polymer made over the silica-titania cogel containing no added titanium was an active polymerization catalyst but even in the presence of 30 psig hydrogen the melt index of polymer was only 7.7 as run 5 reveals. In the presence of 30 psig hydrogen, the cogel with 1 weight percent added titanium produces a polymer with more than double the melt index (18.1) as a comparison of runs 5 conditioned by calcining it in dry air at 1500° F. for 5 hours. After cooling, the conditioned composite was impregnated with a benzene solution of dibenzene chromium sufficient to add about 0.5 weight percent chromium based on the dry mixture. After evaporation of the solvent in a nitrogen atmosphere, the catalyst was activated by heating it for 30 minutes at 250° F. in nitrogen. Ethylene was polymerized over the catalysts in a 2 liter stirred reactor in a particle form process using 1¼ pounds isobutane as the diluent and in the presence of hydrogen. The amount of catalyst added to the reactor varied from about 0.025 to about 0.103 grams in the runs shown in the Table which is equivalent to about 0.001–0.003 weight percent based on the reactor contents prior to initiating polymerization. The results are presented in Table 2. A description of M.I., HLMI/MI and productivity is given in Table 1 footnotes.

Table 2
Particle Form Polymerization of Ethylene

| Run No. | Catalyst | Reactor Temp. °F. | Pressure, psig Total | Pressure, psig Hydrogen | Catalyst Wt. Grms. | Run Time Min. | Productivity | M.I. | Polymer HLMI MI |
| --- | --- | --- | --- | --- | --- | --- | --- | --- | --- |
| 11 | G | 210 | 500 | 50 | 0.104 | 104 | 3000 | 29 | 47 |
| 12 | H | 210 | 550 | 50 | 0.0526 | 64 | 1940 | 43 | not determined |

The results show that active catalysts are obtained from properly activated, supported dicumene chromium and dibenzene chromium compounds. The latter compound appears to be more active than dicumene chromium in the tests as indicated by the reduced chromium content and lesser catalyst weight needed. However, both chromium compounds have the capability of producing ethylene polymers having high melt index values in the presence of hydrogen in a particle form polymerization process.

While this invention has been described in detail for the purpose of illustration, it is not to be construed as limited thereby, but is intended to cover all changes and modifications within the spirit and scope thereof.

What is claimed is:

1. A process for producing a catalyst comprising:
   impregnating a particulate support of a silica coprecipitated with a titanium compound with a nonaqueous solution of tetraisopropyl titanate in an amount sufficient to give 0.5 to 3 weight percent titanium based on the weight of said support;
   calcining said titanium-impregnated support in air at a temperature within the range of 900° to 1700° F.;
   thereafter impregnating the thus calcined titanium-treated support with a nonaqueous solution of a $\pi$-bonded organochromium compound selected from dibenzene chromium or dicumene chromium in an amount sufficient to give 0.1 to 10 percent by weight of the organochromium compound per 100 parts by weight of said calcined support; and
   thereafter heating the thus-organochromium-impregnated support in a nitrogen atmosphere at a temperature within the range of 300° to 400° F. for 0.5 to 20 hours to activate same.

2. A method according to claim 1 wherein said nitrogen atmosphere is a flowing nitrogen stream.

3. A catalyst produced by the method of claim 1.

4. A polymerization process which comprises contacting ethylene under polymerization conditions in a liquid diluent at a temperature such that at least a substantial part of polymer produced is insoluble in said diluent with a catalyst produced by the method of claim 1.

5. A method according to claim 4 wherein said contacting is carried out at a temperature within the range of 150° to 230° F.

6. A method according to claim 4 wherein said contacting is carried out in a liquid diluent selected from paraffins or cycloparaffins or mixtures thereof having 3 to 12 carbon atoms per molecule.

7. A method according to claim 6 wherein said diluent is selected from the group consisting of propane, isobutane, cyclohexane, n-dodecane, and methyl cyclohexane.

8. A method according to claim 7 wherein said diluent is isobutane.

* * * * *